Patented Sept. 20, 1932

1,878,056

UNITED STATES PATENT OFFICE

HUGO WOLFF, OF MANNHEIM, GERMANY, ASSIGNOR TO GENERAL ANILINE WORKS, INC., OF NEW YORK, N. Y., A CORPORATION OF DELAWARE

VAT DYESTUFFS

No Drawing. Application filed June 25, 1930, Serial No. 463,831, and in Germany July 2, 1929.

The present invention relates to the manufacture and production of vat dyestuffs by halogenating anthraquinonylaminobenzanthrones and derivatives thereof and subjecting the halogenation products to alkaline condensation.

I have found that vat dyestuffs are obtained by treating anthraquinonylaminobenzanthrones or derivatives thereof with halogenating agents and subjecting the halogenation products to alkaline condensation. As initial materials benzanthrones and dibenzanthronyls containing one or several anthraquinonyl residues attached thereto by means of a N-H group may be employed. Compounds of the said kind are for example described in the British specifications Nos. 306,874 and 307,723. The halogenation may be carried out in organic solvents, better results, however, are obtained by halogenation in inorganic acids, such as for example sulphuric acid and chlorsulphonic acid. The alkaline condensation is carried out at elevated temperatures, the precise range of temperature depends on the alkaline condensing agent and the initial material employed in each case and is about between 130° and 200° C., when using alcoholic caustic alkalies, but may be higher, such as 240° C. or more, when using for instance a melt of caustic alkalies.

The products obtained in the aforedescribed manner show a marked deepening of shade in contrast to the dyestuffs obtained from the non-halogenated initial materials. Thus for example from 1'-anthraquinonyl-6-aminobenzanthrone a blue black vat dyestuff is obtained in the alcoholic potash fusion, whereas, this compound, when it has previously been exposed to the action of bromine, yields under the same conditions deep black dyestuffs. Likewise condensation products which contain the anthraquinonylamino radicle in the 7-position of the benzanthrone radicle and which generally speaking are converted in the alcoholic potash fusion into dark blue vat dyestuffs, yield blue black to deep black dyestuffs when halogen is introduced before the alkaline treatment.

The following examples will further illustrate the nature of this invention, but the invention is not restricted to these examples. The parts are by weight.

Example 1

10 parts of 1'-anthraquinonyl-6-aminobenzanthrone are dissolved in the cold in 100 parts of chlorsulphonic acid and 4 parts of bromine are added. The whole is allowed to stand at ordinary temperature until the bromine has been used up and the whole is then heated for several hours at from 25° to 35° centigrade in order to complete the reaction. After working up the reaction mixture in the usual manner the brominated product is obtained as a brown powder which dissolves in concentrated sulphuric acid giving a wine red coloration.

10 parts of this brominated product are introduced at about 150° centigrade into a melt of 40 parts of caustic potash and from 20 to 25 parts of ethyl alcohol. The temperature of the melt is then raised to from 160° to 165° centigrade and the whole is stirred at the same temperature until the formation of dyestuff is completed. The melt is then boiled up with water and the dyestuff which separates is filtered and washed while hot. In this manner a black paste is obtained which is a black powder when dried and which dissolves in concentrated sulphuric acid giving a grey brown coloration. The dyestuff gives a violet brown vat with caustic soda and hydrosulphite from which the vegetable fibre is dyed fast deep black shades.

Example 2

10 parts of 1'-anthraquinonyl-7-aminobenzanthrone are brominated as described in Example 1. The brominated product is thus obtained as a brown powder which dissolves in concentrated sulphuric acid giving a blue violet coloration.

10 parts of this brominated product are fused with 50 parts of caustic potash and 30 parts of ethyl alcohol at from 180° to 190° C. until the formation of the dyestuff is completed. The melt obtained is boiled with water for some time until the dyestuff has completely separated out which is then filtered and washed with hot water. The dyestuff thus obtained is a black paste which is a black powder when dried and which dissolves in concentrated sulphuric acid giving a violet brown coloration. It gives a blue vat with caustic soda solution and hydrosulphite from which the vegetable fibre is dyed fast black shades.

*Example 3*

1 part of the brominated compound of the condensation product of 7-chlorbenzanthrone and 1-amino-4-methoxyanthraquinone obtained in the manner described in Example 1 is introduced at 180° C. into a melt of from 4 to 5 parts of caustic potash and from 2 to 3 parts of methyl alcohol and fused at from about 190° to 200° C., until unchanged initial material can no longer be detected. The dyestuff worked up in the usual manner is a black paste which is a black powder when dried and which dissolves in concentrated sulphuric acid giving a violet brown coloration. It dyes the vegetable fibre bluish black shades from a blue vat.

Other suitable alcohols may be employed instead of methyl alcohol.

*Example 4*

10 parts of a mixture of 1'-anthraquinonyl-6- and -7-aminobenzanthrones are dissolved in 15 times the amount of sulphuric acid monohydrate, 3.6 parts of bromine are added and the whole is stirred at from 20° to 25° C. until the bromine is completely used up. The bromine product thus obtained is a brown red powder which dissolves in concentrated sulphuric acid giving a red brown coloration.

5 parts of this brominated product are fused at from 180° to 190° C. with 20 parts of caustic potash and 15 parts of absolute alcohol until the formation of dyestuff is completed. The dyestuff obtained is a black paste which is a black powder when dried and which dyes the vegetable fibre bluish black shades from a blue grey vat. The dyestuff dissolves in concentrated sulphuric acid giving a grey brown coloration.

Instead of the brominated product employed in this example, bromination products of 1'-anthraquinonyl-6- and -7-aminobenzanthrones obtained by other methods may be employed, as for example those which have been prepared with larger amounts of bromine or at higher temperatures or by means of chlorsulphonic acid as solvent. In this manner dyestuffs are obtained which dye bluish to greenish black shades according to the degree of the bromination.

*Example 5*

5 parts of di-1'-anthraquinonyl-7.7'-diamino-2.2'-dibenzanthronyl are dissolved while cooling in 60 parts of chlorsulphonic acid and are treated with 2.5 parts of bromine as described in Example 1. The resulting brominated product is a yellow brown powder which dissolves in concentrated sulphuric acid giving a blue violet coloration.

1 part of this brominated compound is fused at from 180° to 190° C. with from 4 to 5 parts of caustic potash and from 2 to 3 parts of ethyl alcohol. The dyestuff obtained is a black paste which dyes the vegetable fibre bluish black shades from a blue vat. When dried the dyestuff is a black shades from a blue vat. When dried the dyestuff is a black powder which dissolves in concentrated sulphuric acid giving a brown violet coloration.

A similar dyestuff is obtained by subjecting a dianthraquinonyl-7.7'-diamino-Bzl.Bzl'-dibenzanthronyl brominated as described above to alcoholic potash fusion at from 130° to 150° C. instead of the brominated compound employed in this example.

What I claim is:—

1. A process of producing vat dyestuffs, which comprises treating 1'-anthraquinonyl-7-aminobenzanthrone in chlorsulphonic acid with bromine and subjecting the brominated product to alkaline condensation.

2. As a new article of manufacture a vat dyestuff of the benzanthrone series forming a black paste and a black powder, dissolving in concentrated sulphuric acid giving a violet brown coloration, dyeing the vegetable fibre from a blue vat fast black shades, said dyestuff being obtainable by brominating 1'-anthraquinonyl-7-aminobenzanthrone and subjecting the brominated product to alkaline condensation.

In testimony whereof I have hereunto set my hand.

HUGO WOLFF.